July 10, 1934.                    W. J. MORRILL                    1,966,212
                          VARIABLE SPEED SINGLE PHASE MOTOR
                                Filed June 23, 1932

Inventor:
Wayne J. Morrill,
by Charles V. Tuller
His Attorney.

Patented July 10, 1934

1,966,212

UNITED STATES PATENT OFFICE 1,966,212

VARIABLE SPEED SINGLE PHASE MOTOR

Wayne J. Morrill, Fort Wayne, Ind., assignor to General Electric Company, a corporation of New York Application June 23, 1932, Serial No. 618,896

4 Claims. (Cl. 172—279)

My invention relates to variable speed single phase motors in which the change in speed is obtained by changing the effective number of poles of the primary winding. In the single phase motor where starting is obtained by a split in phase between main and starting windings, the winding arrangements heretofore used to change the speed by a change in pole numbers have been somewhat uneconomical, and have often necessitated an undesirably complicated control, bearing in mind that to obtain the proper starting torque it is usually desirable to start the motor on the high speed or lower pole number winding.

My invention relates to improvements in split phase started pole changing single phase motors, particularly with respect to the points just mentioned.

The features of my invention which are believed to be novel and patentable will be pointed out in the claims appended hereto. For a better understanding of my invention, reference is made to the accompanying drawing, illustrating in Fig. 1 an arrangement where a relatively weak N pole starting winding is connected in series with a strong (N+X) pole running winding. This motor winding structure is relatively inexpensive and requires only a simple switch which serves both as a line switch and speed control switch; and Fig. 2 illustrates a pole changing motor having two main windings of different pole numbers and a starting winding corresponding to the main winding of higher pole number. This arrangement gives excellent performance, and the speed selecting switch is arranged so that the main winding of lower pole number cannot be energized until the motor has been started on the higher pole number winding.

Figure 1:
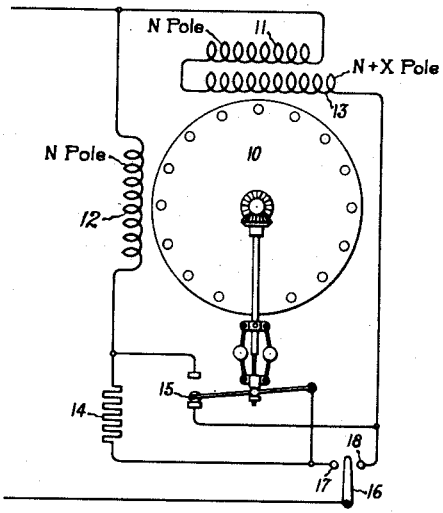
Figure 2:
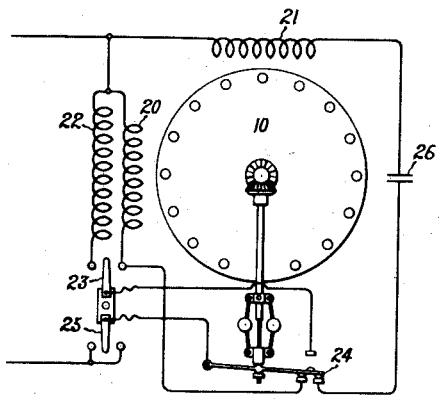

Referring first to Fig. 1, this arrangement is suitable for fan loads where the starting duty is not too heavy. The rotor 10 of the motor in this and in the other figure is represented as the secondary, and is of the squirrel cage type. In Fig. 1, the primary windings consist of angularly displaced windings 11 and 12 of the same pole number designated N. Winding 11 is connected in series with a winding 13 of (N+X) poles, and these windings 11 and 13 are wound with the same general displacement with respect to winding 12 and winding 11 is designed to produce a relatively weak field as compared to that produced by winding 13. A phase modifying device consisting of a resistance 14 is connected in series with winding 12 and is arranged to be short-circuited by a speed responsive switch 15 after the starting operation. 16 is the speed selecting and line switch.

I will assume for the purpose of illustration that windings 11 and 12 are wound for 6 poles and winding 13 for 10 poles. As thus arranged, it will be apparent that it is necessary to energize all of the windings for starting, since if we should energize winding 12 alone, or series connected windings 11 and 13 alone, no effective phase split would result. The speed responsive switch 15 is shown in the starting position, and if switch 16 is closed on either of its cooperating contacts 17 or 18 the motor will start with all windings energized and with resistance 14 in series with winding 12. Under these starting conditions field winding 11 produces sufficient 6 pole flux displaced in time phase with the flux produced by the winding 12 to cause the motor to start as a 6 pole motor. The 10 pole winding 13 is largely ineffective at this time, due to a substantially non-inductive relation of its resultant flux with other fluxes of the motor. Consequently, the motor starts as a normal split phase motor on the 6 pole windings.

If it is desired to operate at the highest speed, switch 16 will have been thrown to contact 17 in starting the motor. Now, when the centrifugal switch 15 snaps to cut out starting resistance 14, it also cuts out windings 11 and 13. Consequently, the motor will operate single phase on the high speed or 6 pole winding 12. If, on the other hand, switch 16 had been closed on contact 18 in starting the motor, the winding 12 would have been cut out of circuit by the operation of the speed responsive switch 15, leaving only windings 11 and 13 in series for normal operation. Nevertheless, the motor would have started as a 6 pole motor, because with the switch 15 in the starting position the starting connections are the same for either position of switch 16.

As previously mentioned, the 10 pole winding 13 is made stronger than the 6 pole winding 11, and under the operating conditions just assumed winding 13 predominates and the motor runs single phase as a 10 pole motor. When in operation at either speed, the speed can be changed at will by throwing switch 16 without going through the starting operation.

In Fig. 2, the quadrature displaced windings 20 and 21 have the same pole number, which is less than the pole number of winding 22. For illustration, I will assume that 20 and 21 are 6 pole windings, and 22 a 10 pole winding. While winding 22 is represented as being in the same axis as winding 20, this is immaterial. Winding 22 may be wound in any relation to the other windings, because, as I will presently explain, it is never energized with either of the other windings. Consequently, winding 22 may be placed to obtain the most economical space distribution winding arrangement, without regard to its displacement with respect to the other windings. 23 represents the speed selecting switch, 24 a speed responsive switch, and 25 a line switch for the motor. A phase modifying condenser 26 is included in series with starting winding 21 and speed responsive switch 24.

It will be noted that the low speed winding 22 cannot be energized at standstill, because even though switch 23 be moved to the left to select low speed operation, the circuit of winding 22 is open at the upper contact of the automatic speed responsive switch 24, which is shown in the starting position. However, even though switch 23 is moved to select low speed operation, the motor will start on the high speed or lower pole number windings by closing line switch 25, because both the high speed windings 20 and 21 will be closed through the lower contacts of the speed responsive switch 24. Consequently, I obtain the same and the correct starting connections regardless of the two closed positions of speed selecting switch 23. The motor starts as a normal split phase motor on windings 20 and 21, and operates single phase on either the 6 pole or 10 pole winding 20 or 22, depending on the position of switch 23. The speed responsive switch 24 is, of course, adjusted to snap to running position, cutting out starting winding 21 below the lowest operating speed. The speed control and line switches 23 and 25 may conveniently be combined in a single switching means, as represented.

It will be noted that in both the modifications illustrated the motor is started on the high speed pole number, and, in fact, cannot be started otherwise, but that, nevertheless, the speed desired may be selected at the time the motor is started, necessitating no further change in connections after the speed responsive starting switch operates. However, in both modifications the pole number and speed may be changed at will while the motor is in operation, it being unnecessary to go through the starting operation to change from a low to high or from a high to low speed.

The invention is not confined to the type of phase splitting device used or to the particular pole numbers mentioned. Such other modifications of the invention as will occur to those skilled in the art are intended to be included within the scope of the appended claims.

What I claim as new and desire to secure by Letters Patent of the United States, is,—

1. A single phase alternating current motor having only three primary windings for alternate operation at two different pole numbers and speeds, manual switching means associated with said primary windings having different positions for selecting the operating pole number of the motor, a phase modifying device associated with one of the primary windings for obtaining split phase starting, automatic switching means for rendering said phase modifying means ineffective after the motor is started, and connections to said automatic switching means for obtaining the same motor circuit starting conditions, irrespective of the selective position of the manual switching means.

2. A single phase motor having a primary member with a relatively weak N pole primary winding and a relatively strong N+X pole primary winding connected in series and disposed on one axis, and an N pole primary winding angularly displaced therefrom, a phase modifying device connected in series with the last mentioned winding, a speed responsive switch for connecting said series connected circuits in parallel for split phase starting and short-circuiting said phase modifying device and opening the parallel connection for normal operation, and a line switch for said motor for selectively energizing either of said parallel circuits.

3. A single phase motor having a primary member with main and starting windings of the same pole number displaced at an angle to each other, a second main winding on said primary member of a different number of poles, a speed responsive switch having contacts for energizing the windings of the same pole number in parallel below a given speed for starting purposes, and a contact for energizing either of said main windings above said speed for normal operation, and manual means for selecting which of the main windings will be energized when the speed responsive switch changes from starting to running condition.

4. A single phase motor having a primary member with main and starting windings of the same pole number displaced with respect to each other, a second main winding on said primary member of a greater number of poles than the first mentioned windings, a speed responsive switch having a moving contact with low and high speed positions and through which the motor is energized, a pair of stationary contacts with which said moving contact engages in its low speed position for energizing the displaced windings of lower pole number in parallel circuits, and a stationary contact with which the moving contact engages when in the high speed position for energizing one or the other of said main windings, and a speed selective switch between said last mentioned stationary contact and said main windings.

WAYNE J. MORRILL.